Dec. 25, 1962 W. A. LEDWITH 3,070,015
MISSILE INTERSTAGE SEPARATING DEVICE
Filed June 1, 1960
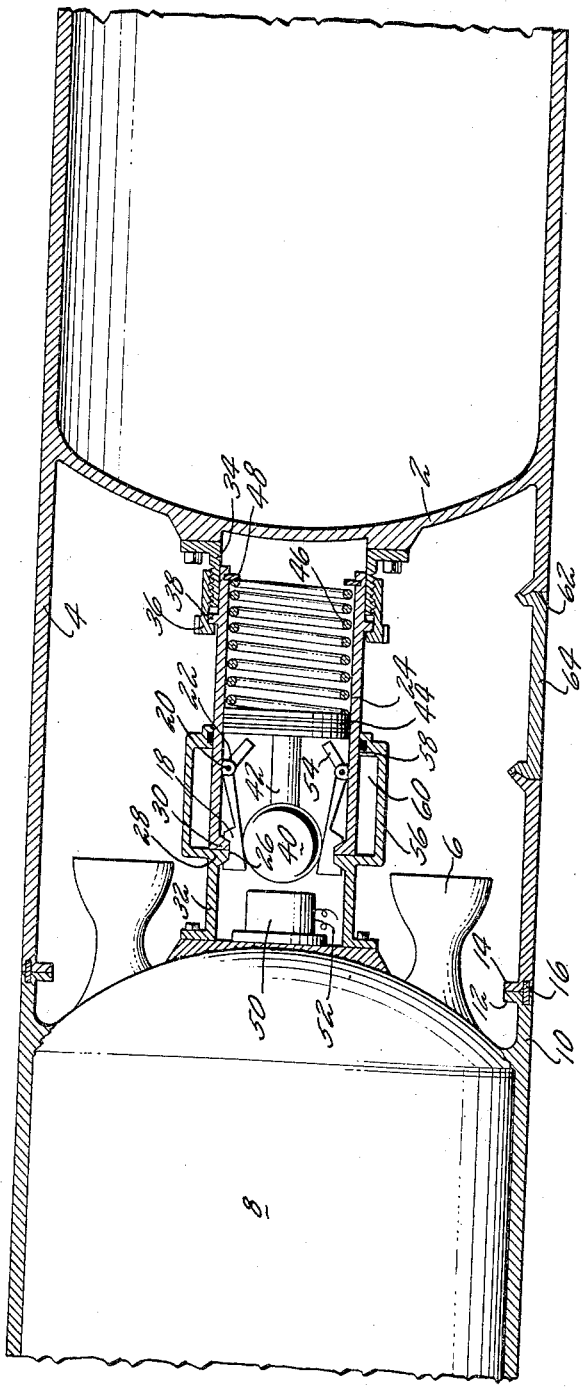
INVENTOR
WALTER A. LEDWITH
BY Charles Allen
ATTORNEY United States Patent Office 3,070,01...
Patented Dec. 25, 196...

3,070,015
MISSILE INTERSTAGE SEPARATING DEVICE
Walter A. Ledwith, Glastonbury, Conn., assignor to United Aircraft Corporation, East Hartford, Conn., a corporation of Delaware
Filed June 1, 1960, Ser. No. 33,254
13 Claims. (Cl. 102—49)

The present invention relates to a device for holding a rocket stage to a vehicle or for holding adjacent stages of a multi-stage rocket together such that they may be released when separation is desired.

One feature of the present invention is an arrangement by which a single element holds a plurality of locking devices in locking position and provides for positive disengagement of the locking device for separation of a burned-out rocket stage from a vehicle or from the successive rocket stage.

Another feature of the invention is an arrangement which, in addition to disengaging the retaining devices, will also provide a separating force for disposing of the burned-out rocket stage. Another feature is the use of pressure for disengaging the latch and for simultaneously providing a separating force between the rocket stages.

Other features and advantages will be apparent from the specification and claims, and from the accompanying drawing which illustrates an embodiment of the invention.

The single FIGURE is a fragmentary longitudinal sectional view through a portion of a multi-stage rocket.

The invention is shown as applied to a multi-stage rocket in which the first stage rocket is represented by the head 2 of the combustion chamber. This stage carries a forwardly projecting circumferential ring or sleeve 4 which surrounds the nozzles 6 projecting rearwardly from the vehicle 8 which is shown as the next stage rocket. It will be understood that although the vehicle is shown as a rocket stage with rearwardly projecting nozzles, the vehicle 8 could be a missile or vehicle intended to orbit in space, the expended rocket 2 being ejected from the vehicle 8 as will be hereinafter described.

The vehicle or second stage rocket 8 has a rearwardly projecting sleeve or ring 10 engaging endwise with the sleeve 4 to hold the successive rocket stages apart. These sleeves may have cooperating radial flanges 12 and 14 which interengage, as shown, and which may be held in alignment as by one or more dowel pins 16.

The successive rocket stages are held together axially by a plurality of latches 18, these latches being arranged in a ring and being each pivoted on a supporting pin 20 on a projecting lug 22 on the inner side of a sleeve or ring 24. Each latch has a notch 26 to fit over cooperating flanges 28 and 30 on the downstream end of a ring 32 and on the upstream end of the sleeve 24.

The ring or sleeve 32 is fixed to the vehicle 8 and extends rearwardly therefrom within the ring of nozzles 6 to engage endwise with the sleeve 24. This sleeve 24 fits within a ring or sleeve 34 attached to the upstream end of the combustion chamber 2 and the sleeve 24 is urged rearwardly into the ring 34 by a threaded clamping ring 36 which fits over and engages a flange 38 on the sleeve 24. Since the latches 26 hold the sleeves 32 and 24 in endwise engagement, the clamping action of the ring 36 pulls the sleeves 24 and 32 rearwardly and thereby functions to hold the sleeves 4 and 10 in secure endwise engagement. The head 2 of the first stage rocket and the vehicle 8 are thus held securely in axial spaced relation.

The several latches 18 are held in the operative position shown by an axially movable ball or plug 40 positioned within the ring of latches and engaging with said latches adjacent the forward ends thereof. This ball has a projecting stem 42 attached to a piston 44 slidable within the sleeve 24 and urged in a forward direction (to the left in the drawing) by a coil spring 46 positioned between said piston and a ring 48 carried by the sleeve 24. With the parts in the position shown, the latches 18 are held securely in position by the ball 40 and the rocket stages are thereby held securely in engagement with one another through the medium of the sleeves 4 and 10.

For the purpose of disengaging the burned-out first stage rocket, the ring 32 has positioned therein a powder charge 50 which may be ignited as by an electrical impulse through conduits 52. When this powder charge is ignited the pressure within the ring 32 is elevated and fills the space within the ring 32 and the sleeve 24. The powder charge is located in this space which is forwardly of the piston 44 thereby urging the latter rearwardly into a position to disengage the latches 18. In order that the latches may be positively disengaged each latch 18 has a projecting actuating arm 54 in a position to be engaged by the ball as it is carried to the right by the piston. As these arms are moved outwardly, the locking ends of the latches are withdrawn inwardly from the flanges 28 and 30.

The powder charge functions also to provide a pressure tending to separate the rocket stages. This pressure is initially in the space between the location of the powder charge and the piston 44 and acts on the piston. As the rocket stages begin to separate so that the flanges 28 and 30 are separated the escape of this separating pressure is limited for a time by providing on the ring 32 an integral rearwardly extending flange 56 having at its rearward end a circumferential surface 58 engaging with the outer surface of the sleeve or ring 24. The flange 56 defines an annular chamber 60 surrounding the upstream end of the sleeve 24 and this chamber limits the escape of the fluid providing the separating pressure until the sleeve 24 has moved far enough to the rear to be completely withdrawn from the surrounding surface 58.

Assembly of the parts is possible through an access opening 62 in the sleeve 4. It will be apparent that the latching device may be assembled as an entity before it is attached to the ring 34. Thus, the sleeve 24 and the piston are assembled with respect to the ring 32 in the position shown in the drawing and the rocket 2 is then brought into position with the flanges 12 and 14 in engagement, as shown. At the same time the downstream or rearward end of the sleeve 24 is positioned within the ring 34. Subsequently, tightening of the clamping ring 36 by reaching through the access hole 62 will complete assembly of the device in readiness for launching of the assembly. A cover 64 closes the access hole 62 if desired.

It is to be understood that the invention is not limited to the specific embodiment herein illustrated and described, but may be used in other ways without departure from its spirit as defined by the following claims.

I claim:

1. A locking means for holding a vehicle member and a rocket stage member in assembled relation, said vehicle member and said stage member having cooperating rings thereon in endwise engagement with each other to hold said stage and vehicle members in predetermined axially spaced relation, said locking means including cooperating sleeves mounted on the vehicle and stage members, respectively, said sleeves interfitting one within the other, a plurality of latch means pivotally mounted on one of said sleeves and engaging with the other sleeve to hold said sleeves in assembled relation, said latches being arranged in a ring, and a plug fitting within the ring of atches and in engagement therewith to hold said latches in locking position.

2. A locking means as in claim 1 in which an explosive charge is provided within said sleeves to provide gas under pressure for moving said plug axially out of locking position.

3. A locking means as in claim 1 in which said interengaging sleeves have cooperating endwise engaging surfaces to limit relative axial movement, one of said sleeves being axially adjustable with respect to the member supporting it.

4. A locking means as in claim 3 in which said latches engage with projecting flanges on said sleeves adjacent to the interengaging surfaces.

5. A locking means as in claim 1 in which a piston is connected to said plug and is slidable in one of the sleeves and an explosive charge is positioned within one of said sleeves for pressurizing the space therein to move the piston and the plug into latch releasing position.

6. A locking means as in claim 1 in which a spring acts on the plug for holding the latter releasably in operative position.

7. In a space vehicle, at least two successive rocket stages and means for holding successive stages releasably together in which said stages have cooperating axial supporting sleeves in endwise engagement, said holding means including cooperating holding sleeves, one on each rocket stage, said holding sleeves interfitting one within the other and a plurality of latch means pivoted on one of said holding sleeves and engaging the other holding sleeve to hold said holding sleeves in assembled relation, said latches being arranged in a ring, and means positioned within the ring of latches and engaging all of said latches to hold them in locking position.

8. A space vehicle as in claim 7 in which the latch engaging means is an axially movable plug, and a spring acts on the plug to hold it in latch locking position.

9. A locking means for holding a vehicle and a rocket stage in assembled relation, said vehicle and said rocket stage having cooperating sleeves thereon, said sleeves having interengaging radially extending surfaces to limit axial movement, a plurality of latches arranged in a ring on one of said sleeves and having locking surfaces thereon engaging the other of said sleeves to hold the interengaging surfaces in contact and axially movable means engaging said latches to hold them in operative position.

10. A locking means as in claim 9 in which each of the latches has a projecting lever arm engageable by said axially movable means for disengaging said latches as said axially movable means is moved in a latch disengaging direction.

11. A locking means as in claim 9 in which spring means are positioned within one of said sleeves in engagement with said axially movable means for holding said last means in latch locking position.

12. A locking means as in claim 9 in which an explosive charge is positioned within one of said sleeves to pressurize the space between said charge, and said axially movable means to cause axial movement of said movable means in a direction to disengage the latches.

13. A locking means for holding a vehicle member and a rocket stage member in assembled relation, said vehicle member and said stage member having cooperating rings thereon in endwise engagement to hold said stage member and vehicle member in predetermined axially spaced relation, said locking means including cooperating sleeves mounted on the vehicle and stage members, respectively, said sleeves interfitting one within the other, a plurality of latch means pivotally mounted on the inner of said sleeves and engaging with the outer sleeve to hold said sleeves in assembled relation, said latches being arranged in a ring, a plug fitting within the ring of latches and in engagement therewith to hold the latches in locking position and an explosive charge positioned within one of said sleeves for supplying pressure for moving said plug out of latch-locking position, said sleeves overlapping for retaining the pressure of said explosive charge within the sleeves during separation of the vehicle and rocket.

References Cited in the file of this patent
UNITED STATES PATENTS
2,655,105   Hansche _____ Oct. 13, 1953